United States Patent [19]

Block et al.

[11] Patent Number: 4,529,006
[45] Date of Patent: Jul. 16, 1985

[54] ELECTROHYDRAULIC THREE-PORT, TWO POSITION VALVE

[76] Inventors: Siegmar Block, Uhlenstr. 21, 4300 Essen; Günter Blumenthal, Sienbeckstr. 28, 4358 Westerholt, both of Fed. Rep. of Germany

[21] Appl. No.: 633,668

[22] Filed: Jul. 23, 1984

Related U.S. Application Data

[63] Continuation of Ser. No. 376,837, May 10, 1982, abandoned.

[30] Foreign Application Priority Data

Jun. 10, 1981 [DE] Fed. Rep. of Germany ....... 3122961

[51] Int. Cl.³ ............................................. F15B 13/044
[52] U.S. Cl. .......................... 137/625.65; 137/596.17; 137/625.69; 251/DIG. 1
[58] Field of Search ...................... 137/625.65, 625.69, 137/596.17, 625.48; 251/DIG. 1; 277/152

[56] References Cited

U.S. PATENT DOCUMENTS

| | | | |
|---|---|---|---|
| Re. 25,251 | 10/1962 | Quail | 137/625.69 X |
| 477,088 | 6/1892 | Von Mitzlaff | 137/625.69 |
| 2,702,049 | 2/1955 | Seeloff | 137/625.69 |
| 3,079,947 | 3/1963 | Hunt et al. | 137/625.69 X |
| 3,426,998 | 2/1969 | Kintner | 251/324 |
| 3,603,348 | 9/1971 | Wright | 137/625.64 |
| 3,680,596 | 8/1972 | Pickett | 137/625.69 |
| 4,325,402 | 4/1982 | Akkerman et al. | 137/625.69 X |

FOREIGN PATENT DOCUMENTS

| | | | |
|---|---|---|---|
| 2108705 | 8/1972 | Fed. Rep. of Germany | 137/625.69 |
| 2551180 | 5/1977 | Fed. Rep. of Germany | 137/625.48 |
| 1268371 | 3/1972 | United Kingdom | 277/152 |
| 1423479 | 2/1976 | United Kingdom | 137/625.48 |

Primary Examiner—Gerald A. Michalsky

[57] ABSTRACT

A three-port, two-position electrohydraulic valve has an elongated valve member reciprocatably guided in a bore of the valve housing only by two sealing rings of small friction and including only two further sealing rings cooperating with sealing edges respectively provided on the valve member and the housing for controlling fluid flow between the three ports. The valve member is reciprocated between two end positions against the force of a return spring by an electromagnet. Such a valve requires only small forces for reciprocation of its elongated valve member, so that a small electromagnet is sufficient.

The valve of the present invention favorably differs from known electrohydraulic three-port, two-position valves which are constructed as seat valves and operated in opening direction by an electromagnet of long stroke and which require also considerable forces during operation, due to large friction forces inherent with seat valves.

7 Claims, 1 Drawing Figure

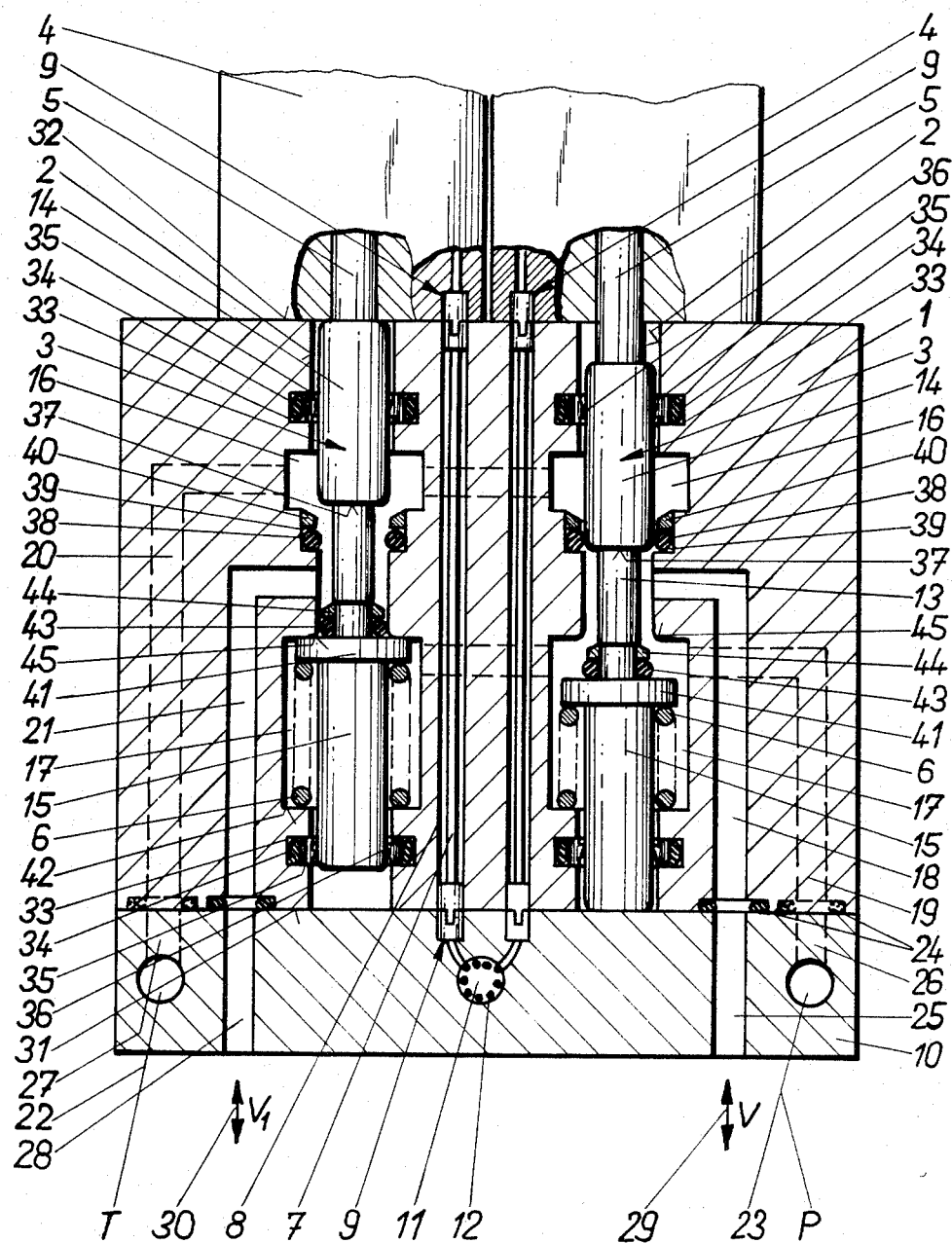

ELECTROHYDRAULIC THREE-PORT, TWO POSITION VALVE

This application is a continuation of application Ser. No. 376,837, filed May 10, 1982, now abandoned.

BACKGROUND OF THE INVENTION

The present invention relates to an electrohydraulic three-port, two-position valve, especially for controls of mine roof supports operated by an oil-in-water emulsion, which comprises a valve rod reciprocatable in a longitudinal bore extending through the valve housing between two end positions by an electromagnet against a restoring force, in which the valve rod comprises on opposite sides of a central, reduced-diameter portion sealing members which cooperate with sealing members on the valve housing in such a manner that, in one end position of the valve rod, a consumer is connected to a tank and, in the other end position, to a pump, in which the consumer communicates with a portion of the bore in region of the reduced diameter of the valve rod, whereas the pump and the tank respectively communicates with radially increased bore portions respectively located in the region of the sealing members.

Such valves are for instance disclosed in German Offenlegungsschrift No. 29 23 719. This known valve is a magnet-operated, three-port, two-position valve with a spring return. The cooperating sealing members comprise in this known valve respectively two conical valve members mounted axially spaced from each other on the valve rod, as well as corresponding seat rings in the valve housing. The movement of the valve rod in one direction is carried out by means of an electromagnet with a long stroke, which acts parallel to the valve rod. The transmission of the force of the magnet armature to the valve rod is carried out by a two-arm tilting lever, mounted on a separate housing, in the relation of the lever arms of about 2:1. The valve rod is moved in the other direction by a coiled compression spring engaged in a hollow portion of the valve rod. The consumer communicates with the bore through the housing in the region of the central reduced-diameter portion of the valve rod, whereas the pump communicates with the bore in the region of the return trunnion, and the tank in the region of the trunnion connected to the magnet armature.

The above mentioned Offenlegungsschrift emphasizes that the valve disclosed therein should provide sufficiently large throughflow amounts. Such throughflow amounts require, however, for hydraulically operated mine roof supports nominal diameters of at least 10 mm. Experience has shown that at such nominal diameters the force for opening a seat valve of the aforementioned construction is about 4000 Newtons. Such a force would therefore be required in the present case, whereby not even the inherent friction forces and the return force of the coil compression spring are considered.

Since in underground mining operations the maximal electrical available power is about 20 watt, it cannot be assumed that in the known case with a magnet of long stroke the necessary moving force for the valve rod can be provided. In this case a tilting lever with a transmission ratio would be necessary, which would require dimensions for the housing which, for the control in an underground mine shaft, would be unrealistic. In addition, it has to be considered that this known valve requires a magnet with a long stroke. The force to be provided by a magnet depends, however, on its stroke. A magnet with a long stroke would therefore have such large force losses that, even with a tilting lever of a very high transmission ratio, the opening resistance of the valve could not be overcome.

Since in the above mentioned known valve the valve members have to be pressed with considerable force against the valve seats, in order to provide the necessary sealing pressure, there necessarily result, under further consideration of the friction, relatively high displacement forces. On the other hand, for safety reasons in underground operations there are only very small operating forces for the control magnets available. Therefore, in order to operate the known three-port, two-position valve, a precontrol valve would be necessarily required. In this case, the magnet would operate a valve with small nominal diameter, and the small volume stream produced thereby would have to be directed to a control piston which would operate the valve rod. Such a valve combination is, however, not only very expensive, but also liable to malfunction. Such precontrol valves can hardly be used at the rough operating conditions prevailing in underground mine operations.

In order to avoid the high operating forces inherent with seat valves, sleeve valves, as for instance disclosed in German Offenlegungsschrift No. 28 08 447, have already been used for the control of mine roof supports operated by an oil-in-water emulsion. The construction of such a sleeve valve requires, however, a large number of seals between the sleeve and the valve housing. Thereby high friction resistance will necessarily be developed which, as in the above mentioned seat valve disclosed in German Offenlegungsschrift No. 29 23 719, will hardly permit a direct movement of the sleeve or slide by a magnet, especially when this valve has to be constructed for a nominal diameter of least 10 mm. If further the return force is considered, which acts against the force applied by the operating magnet, it will be evident that in this case the operating magnet would have to be dimensioned so large that it would be uninteresting for operating an underground mine roof support. Therefore, in this case a direct magnet control is impossible, and only a complicated, expensive precontrol, liable to malfunction, is usable.

SUMMARY OF THE INVENTION

It is therefore an object of the present invention to improve the above described, known electrohydraulic three-port, two-position valve, especially for control of mine roof supports by an oil-in-water emulsion, in such a manner that the friction resistance in the region of the cooperating sealing members on the one hand, and in the region of the mountings for the valve rod, on the other hand, are so small that at a sufficient through-flow cross section of the valve at about a nominal diameter of 10 mm, a direct operation of the valve rod by a small magnet, which may be integrated into the control for underground mine roof supports, is possible.

With these and other objects in view, which will become apparent as the description proceeds, the electrohydraulic valve according to the present invention, especially for controls for mine roof supports operated with oil-in-water emulsions, mainly comprises a valve housing formed with a bore therethrough having two axially displaced radially enlarged portions, a first channel in said valve housing communicating at one end with one of the enlarged portions and adapted to be connected at the other end to a tank, a second channel in said valve housing communicating at one end with the other of the enlarged bore portions and adapted to be connected at the other end to a pump, a third channel communicating at one end with an intermediate portion of said bore between the enlarged bore portions and adapted to be connected at the other end to a consumer, means reciprocatable in the bore between two end positions for providing in one end position communication between the first channel and the third channel while preventing communication of the second channel with the third channel, so that fluid may flow from the consumer to the tank and for providing in the second position communicating between the second channel and the third channel while preventing communication between the first and the third channel, so that fluid may flow from the pump to the consumer, said means comprising an elongated valve rod movable between the aforementioned end positions and having a pair of axially displaced plunger portions slidably guided in the bore, with one of the plunger portions projecting into the one enlarged bore portion, and the other into the other enlarged bore portion, the plunger portions being connected to each other by a connection portion of a cross section smaller than that of the bore, a rounded sealing edge on the housing at the junction of the intermediate bore portion with the other enlarged bore portion and a first sealing ring of polyurethane surrounding the connecting portion at the junction of the latter with the other plunger portion and cooperating with the rounded sealing edge of the housing to prevent in the first end position of the valve rod communication between the other enlarged bore portion and the intermediate bore portion, and a rounded sealing edge on the one plunger portion at the junction of the latter with the connecting portion, and a second sealing ring of polyurethane at the junction of the one enlarged bore portion with the intermediate bore portion and cooperating in the second end position of the valve rod with said rounded sealing edge on the one plunger portion to prevent communication between the one enlarged bore portion and the intermediate bore portion, only one pair of additional sealing rings of hard plastic material in the bore and respectively engaging the plunger portion, and means connected to the valve rod for reciprocating the same between the two end positions.

The valve rod projects with a portion thereof beyond the housing, and the means for reciprocating the valve rod comprise electromagnet means cooperating with the projecting portion to move the valve rod to one of the end positions and spring means acting on the valve rod for moving the latter to the other end position.

The three-port, two-position valve of the present invention is therefore a slide valve operated by a magnet in which no high contact pressures are required to press a valve member against a cooperating valve seat. The magnet has therefore to overcome only friction forces, as well as the force of the return spring.

A small operating force is firstly derived in that the valve rod is guided in the bore against canting. Only the plunger portions of the rod respectively engage sealing rings of hard plastic material. No metallic contact between the valve rod and the valve housing exists. The material for the mounting sealing rings has the advantage that it causes little friction. Therefore, even if the sealing rings are pressed with increasing pressure against the peripheral surface of the valve rod, the thereby produced friction is only slightly increased.

A reduction of the operating forces is furthermore obtained in that the number of dynamic seals is restricted to four. These are, on the one hand, the mounting sealing rings and, on the other hand, the sealing rings forming part of the sealing members and cooperating with the control edges. The last-mentioned sealing rings preferably have a circular cross section and consist of polyurethane. This material is characterized in that it is very wear-resistant but has enough elasticity in order, upon engagement with the control edges, to provide the desired seal. Polyurethane has also the advantage that, even if cracks are formed therein, such cracks will hardly increase. These sealing rings will ensure that the break-away force, that is the force for moving the valve rod from a position of rest, may be held extremely small. The construction of the sealing rings according to the present invention will assure that the break-away forces in the region of the mounting sealing rings are substantially equal to the dynamic friction resistances, and that the break-away forces in the region of the sealing members are substantially equal to the dynamic friction resistances.

Due to the fact that the friction forces at the four contact locations are small, it is also possible to hold the return force correspondingly small. This in turn results that the force which has to be provided by the magnet may be reduced by the force by which the return force is now reduced.

In view of the increasing automatic control in underground mine roof supports, a properly functioning control is therefore created, which is not only easily accessible for its operation and maintenance, but which is also adapted for the required output at a minimum of space requirement so as to be usable at locations in which the coal seam to be mined has a small height, and which requires therefore control arrangements of small volume. The hydraulic part of the valve can be integrated together with the magnetic operating members directly into the respective mine roof support, whereas the transmission of signals is carried out by electrical means. Such a combination has the decisive advantage that the hydraulic conduits can be mounted directly in the mine roof support, whereas only the control signal may be transmitted through thin cables from unit to unit.

According to a further feature of the present invention, the mounting sealing rings formed from hard plastic material, as for instance polytetrafluorethylene, are each provided with an annular sealing lip directed to the side of higher pressure and engaging the respective plunger at the periphery thereof while being in turn embedded at its outer periphery in a soft sealing ring. The soft sealing rings are, together with the mounting sealing rings, arranged in corresponding annular cutouts of the valve housing. The soft sealing rings have, due to their consistency, the ability to expand at increasing pressure in all directions, to thus provide a radial pressure onto the mounting sealing rings over the whole periphery thereof in direction toward the outer periphery of the valve rod. This construction will assure that even at high radial pressure the friction resistance of these mounting sealing rings will only slightly increase.

The mounting sealing rings are preferably mounted in radial enlargements of the longitudinal bore through the housing in the region between the plungers and opposite end faces of the valve housing.

An additional advantageous characteristic according to the present invention consists in that the sealing rings which form part of the sealing members and the mounting sealing rings are mounted with a slight pre-tension in place. The dimensions of the sealing rings and the means for mounting the same are therefore chosen in such a manner that the size of the abutting faces changes only slightly during increasing pressure.

According to the present invention, it is furthermore advantageous that the distance between the sealing edge on the one plunger portion and the first sealing ring is greater by a slight amount than the distance between the second sealing ring and the sealing edge on the housing.

This will lead to a negative overlapping. Therefore, during movement of the valve rod there will exist a short-circuit for a short moment. This will lead to a short stroke of the operating magnet, which in turn permits the use of a small magnet. Furthermore, during movement of the valve rod there will be only one of the sealing rings cooperating with the control edges and the two mounting sealing rings in contact with opposite surfaces. The friction forces are thereby further reduced.

The return force acting on the valve rod is formed according to the present invention by a coil compression spring or by a surface surplus on the return plunger in comparison to corresponding opposite surfaces in the region of the control edge which faces the radial enlargement of the bore.

Preferably, the longitudinal bore in the housing is, in the region of the return plunger, closed by an end plate in which also the connections for conduits leading to the consumer, to the pump, and to the tank, are provided. Such an end plate is especially advantageous when two or a plurality of such valves are combined in one housing. In this case, the one enlarged bore portions of the valves which are to be connected to the tank may be connected by a common channel to the connection in the end plate which leads to the tank, whereas the other radially enlarged bore portions may also be connected by a common channel to the connection in the end plate which leads to the pump.

Preferably, the end plate is provided with a channel for electrical control cables, and the valve housing is provided with an additional channel extending between the end faces for a control cable, and including electrical contact plugs at opposite ends of the additional channel respectively connected to the control cable and the electromagnet.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing illustrates the valve according to the present invention in vertical cross section.

DESCRIPTION OF A PREFERRED EMBODIMENT

Referring now to the drawing, it will be seen that the valve according to the present invention includes a valve housing 1 in which two parallel longitudinal bores 2 are provided in which valve rods 3 are respectively located. The valve rods 3 are reciprocated in the bores 2 by the armatures 5 of the electromagnets 4 against a return force provided by coil compression springs 6.

The two valve rods 3 are of identical construction. Each of the valve rods has a pair of axially displaced plunger portions 14, 15 connected by a connecting portion 13 of radially reduced diameter. Each of the longitudinal bores 2 is provided in the region of the plunger portions 14 and 15 with radially enlarged bore portions 16 and 17. A first channel 20 in the valve housing communicates at one end with the enlarged bore portion 16 and this first channel is adapted to be connected at the other end to a tank T, not shown in the drawing. A second channel 19 in the valve housing communicated at one end with the other enlarged bore portion 17 and is adapted to be connected at the other end to a pump P, not shown in the drawing. Third channels 18 and 21 are respectively provided in the two valves and respectively communicate at one end with the intermediate bore portion, whereas the other ends thereof are adapted to be connected to consumers V, $V_1$, not shown in the drawing. The bores 2 in the housing 1 are closed at one end by an end plate 10 abutting against an end face of the housing 1 and connected thereto in any suitable manner, not shown in the drawing. The end plate 10 is formed with passages or connections 25–28 for the conduit 29 leading to a consumer V, for the conduit 23 leading to a pump P, for a conduit 30 leading to a consumer $V_1$, and for a conduit 22 leading to a tank T. Sealing rings 24 are respectively provided at the end face of the valve housing to which the end plate 10 is connected for each of the channels 18–21.

The valve rods 3 are only at the plungers 14 and 15 guided in the valve housing 1. For this purpose there are provided between the radially enlarged bore portions 16 and 17 and the opposite end faces 31 and 32 of the valve housing annular cut-outs 33 in the valve housing 1, in which soft seals 34 of artificial rubber are embedded. The soft seals 34 encompass the outer periphery of sealing rings 35 of polytetrafluoroethylene. These sealing rings 35 are provided with annular lips 36 respectively extending toward the radially enlarged bore portions 16 and 17 and respectively engaging the outer periphery of the plungers 14 and 15. Therefore there is no metallic contact between the plungers 14 and 15 and the valve housing 1.

The plungers 14 are provided at the junction thereof with the reduced-diameter portions 13 with rounded control edges 37 which cooperate with sealing rings 38 of circular cross section of polyurethane. The sealing rings 38 are embedded in cut-outs 39 of the valve housing 1 and fixed against movement in axial direction by bushings 40.

The other plungers or return plungers 15 are provided at their junction with the reduced-diameter portions 13 with annular collars 41 at which coil compression springs 6 surrounding the plungers 15 abut with one of the ends thereof, whereas the other ends of the springs 6 abut against the bottoms 42 of the radially enlarged portions 17. At the junction of the collars 41 with the reduced-diameter portions 13, there are provided annular sealing rings 43 of polyurethane held against the collars 41 by bushings 44. These sealing rings 43 cooperate with rounded control edges 45 provided in the valve housing at the junction of the connecting bore portion with the enlarged bore portion 17 surrounding the plunger 15.

As can be seen from the drawing, the distance between the control edges 37 on the plungers 14 and the sealing rings 43 is slightly greater than the distance between the sealing rings 38 embedded in the cut-outs 39 of the housing and the control edges 45 on the valve housing 1. During movement of the valve rod between the two end positions only one of the sealing rings 38 or 43 is therefore in contact with the plungers 14 respectively with the valve housing, and both mounting sealing rings 35 in contact with the plungers 14 and 15.

The mounting sealing rings 35 as well as the sealing rings 38 respectively 43 which cooperate with the control edges 37 on the plungers 14 respectively with the control edges 45 on the valve housing are mounted in place with such a pre-tension that the size of their engaging faces differs only slightly from the size of these faces which prevail during pressure admittance.

Assuming the electromagnet 4 on the valve shown at the left side of the drawing is deenergized, then the return spring 6 will hold the valve rod 3 in the position as shown for the left valve in the drawing, so that fluid may flow from the consumer V1 to the tank, whereas when the electromagnet 4 is energized the valve rod 3 will be in a position as shown for the valve on the right side of the drawing, in which pressure fluid from a pump may flow to the consumer V.

It will be understood that each of the elements described above, or two or more together, may also find a useful application in other types of electrohydraulic three-port, two-position valves differing from the types described above.

While the invention has been illustrated and described as embodied in an electrohydraulic three-port, two-position slide valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrohydraulic valve, especially for controls of mine roof supports operated with oil-in-water emulsions, comprising a valve housing formed with a bore therethrough having two axially displaced radially enlarged portions; a first channel in said valve housing communicating at one end with one of said enlarged portions and adapted to be connected at the other end to a tank; a second channel in said valve housing communicating at one end with the other of said enlarged bore portions and adapted to be connected at the other end to a pump; a third channel communicating at one end with an intermediate portion of said bore between said enlarged bore portions and adapted to be connected at the other end to a consumer; means reciprocatable in said bore between two end positions for providing in one end position communication between said first channel and said third channel while preventing communication of said second with said third channel so that fluid may flow from the consumer to the tank and for providing in the other end position communication between said second channel and said third channel while preventing communication between said first channel and said third channel so that fluid may flow from the pump to the consumer, said means comprising an elongated valve rod movable between said end positions and having a pair of axially displaced plunger portions slidably guided in said bore with one of said plunger portions projecting into said one enlarged bore portion and the other into said other enlarged bore portion, said plunger portions being connected to each other by a connecting portion of a cross section smaller than that of said plunger portions and the cross-section of said plunger portions being slightly smaller than the cross-section of said bore, a rounded sealing edge on said housing at the junction of said intermediate bore portion with said other enlarged bore portion and a first sealing ring of polyurethane surrounding said connecting portion at the junction of the latter with said other plunger portion and cooperating with said rounded sealing edge of said housing to prevent in said one end position of said valve rod communication between said enlarged bore portion with said intermediate bore portion, and a rounded sealing edge on said one plunger portion at the junction of the latter with said connecting portion and a second sealing ring of polyurethane at the junction of said one enlarged bore portion with said intermediate bore portion and cooperating in said other end position of said valve rod with said rounded sealing edge on said one plunger portion to prevent communication between said one enlarged bore portion with said intermediate bore portion; only one pair of additional sealing rings of polytetrafluoroethylene in said bore and respectively engaging said plunger portions so as to prevent contact between said bore and said valve rod; and means connected to said valve rod for reciprocating the same between said two end positions; said valve rod projecting with a portion thereof beyond said housing and said reciprocating means comprising electromagnet means cooperating with said projecting portion to move said valve rod to one of said end positions and spring means acting on said valve rod for moving the latter to the other of said end positions; each of said additional sealing rings being provided with an annular sealing lip directed toward the respective enlarged bore portion and engaging the respective plunger portion, and including a soft sealing ring embedding the respective additional sealing ring at the outer periphery thereof; said additional sealing rings being respectively located in the regions of said bore between said enlarged bore portions and opposite end faces of said housing; and means for holding said first, said second, and said additional sealing rings with a slightly pre-tension in place.

2. A valve as defined in claim 1, wherein the distance between said sealing edge on said one plunger portion and said first sealing ring is slightly greater than the distance between said second sealing ring and said sealing edge on said housing.

3. A valve as defined in claim 1, wherein said spring means is a coil compression spring.

4. A valve as defined in claim 1, wherein said bore extends between two end faces of said housing and including an end plate engaging one of said end faces and closing said bore at said one face, said end plate being provided with passages therethrough respectively communicating at one of the ends thereof with the other ends of said first, said second, and said third channel for connecting these channels respectively to a tank, to a pump, and to a consumer.

5. A valve as defined in claim 4, wherein said means for reciprocating said valve rod comprises an electromagnet mounted on the other end face of said housing, and wherein said end plate is provided with a channel, and electrical control cables in said channel.

6. A valve as defined in claim 5, wherein said housing is provided with an additional channel extending between said end faces, and including electrical contact plugs at opposite ends of said additional channel respectively connected to said control cables and said electromagnet.

7. A valve as defined in claim 1 wherein said reciprocable means further includes an annular collar secured to the other plunger portion opposite said rounded sealing edge on said housing, said spring means being arranged in the other enlarged bore portion and acting upon the annular collar to urge the same and said valve rod to the other end position in which said annular collar is in contact with said housing.

* * * * *